United States Patent
Kaneko

(10) Patent No.: US 7,173,892 B2
(45) Date of Patent: Feb. 6, 2007

(54) METHOD AND APPARATUS FOR VALIDATING SECURITY INFORMATION BY SCATTERING THE ID BITS TO PLURALITY OF LOCATIONS AND SELECTING A BIT VALUE WITH HIGHEST FREQUENCY IN EACH COLUMN OF BITS AS CORRECT BIT VALUE

(75) Inventor: Yutaka Kaneko, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 525 days.

(21) Appl. No.: 10/700,100

(22) Filed: Nov. 3, 2003

(65) Prior Publication Data

US 2004/0114483 A1 Jun. 17, 2004

(30) Foreign Application Priority Data

Dec. 12, 2002 (JP) ............................. 2002-360851

(51) Int. Cl.
 *G11B 7/24* (2006.01)
(52) U.S. Cl. ............................. 369/53.21; 369/59.25; 369/275.3
(58) Field of Classification Search ............. 369/53.21, 369/59.25, 275.3
 See application file for complete search history.

(56) References Cited

U.S. PATENT DOCUMENTS

| 5,541,904 A | * | 7/1996 | Fite et al. | ................ | 369/53.21 |
| 6,765,852 B1 | * | 7/2004 | Van Den Enden et al. | ....................... | 369/53.21 |

FOREIGN PATENT DOCUMENTS

JP 2001-035092 2/2001

* cited by examiner

*Primary Examiner*—Gautam R. Patel
(74) *Attorney, Agent, or Firm*—Hogan & Hartson LLP

(57) ABSTRACT

A security control method for an optical disk drive comprises a security information reading step and a security information-determining step. In the security information reading step, security information associated with data to be read is read from a plurality of locations on an optical disk. In the security information-determining step, correct security information is determined by comparing fragments of the security information read from the plurality of locations and then by selecting a security information fragment with the highest frequency. The correct security information is used in processing of the data to be read.

8 Claims, 8 Drawing Sheets

|  |  | SECURITY INFORMATION BIT STRINGS | | | | | | | |
|---|---|---|---|---|---|---|---|---|---|
|  |  | PRECEDING 4 BITS | | | | FOLLOWING 4 BITS | | | |
| ECC DATA BLOCK 1 | 55h | 0 | 1 | 0 | 1 | 0 | 1 | 0 | 1 |
| ECC DATA BLOCK 2 | 75h | 0 | 1 | 1 | 1 | 0 | 1 | 0 | 1 |
| ECC DATA BLOCK 3 | 55h | 0 | 1 | 0 | 1 | 0 | 1 | 0 | 1 |
| ECC DATA BLOCK 4 | 4Dh | 0 | 1 | 0 | 0 | 1 | 1 | 0 | 1 |
| ECC DATA BLOCK 5 | 55h | 1 | 0 | 0 | 1 | 0 | 1 | 0 | 1 |
| ECC DATA BLOCK 8 | 97h | 0 | 1 | 0 | 1 | 0 | 1 | 1 | 1 |
| CORRECTED SECURITY INFORMATION | 55h | 0 | 1 | 0 | 1 | 0 | 1 | 0 | 1 |

Fig. 8

METHOD AND APPARATUS FOR VALIDATING SECURITY INFORMATION BY SCATTERING THE ID BITS TO PLURALITY OF LOCATIONS AND SELECTING A BIT VALUE WITH HIGHEST FREQUENCY IN EACH COLUMN OF BITS AS CORRECT BIT VALUE

BACKGROUND OF THE INVENTION

1. Field of the Invention

The present invention relates to an optical disk drive, an optical disk, a security control method for an optical disk drive, and a security control program product for an optical disk drive, by which security and accessibility in an optical disk system for optical disks such as a compact disk and a digital versatile disk are improved.

2. Description of the Related Art

In response to increasing demand for larger data recording capacities, such as for motion picture recording, high recording density compact disks (HD-Burn-CDs: High-Density-Burn type) and digital versatile disks (DVDs) are widely used.

For such high capacity memory devices, security-related objectives are to protect against unauthorized tampering with data stored therein and to prevent unauthorized parties from reading the data.

Japanese Patent Laid-Open Publication No. 2001-35092 discloses a technique for improving security of a removable memory such as an optical disk. In this technique, a control area where general users cannot rewrite is pre-allocated in a memory space of a removable memory, and security information such as a user password is recorded in the control area. A user is required to input verification information when accessing the removable memory. A comparison is made between the security information recorded in the control area and the verification information input by the user, and, if a predetermined condition is satisfied, access to the removable memory is allowed.

However, in the above-described conventional technique, a control area to which general users cannot easily make access must be allocated on the removable disk. Because the control area stores control data corresponding to all data to be stored on the removable disk, it is necessary to pre-allocate a considerable memory area as the control area. As a result, there is a significant disadvantage in that the available recording area is reduced.

Furthermore, in the above-described conventional technique, security information corresponding to all data stored on a removable disk is stored collectively in the control area. Therefore, an unauthorized party attempting to read the security information can easily find that information, and thus, with that conventional technique, problems such as leakage and tampering of the security information remain common.

Furthermore, during writing or reading of data, a disk drive head must be frequently moved between the data recording area and the control area on the removable disk. Accordingly, there is a problem in that data access time is increased.

SUMMARY OF THE INVENTION

In consideration of the problems with the above-described conventional technique, the present invention was conceived to provide an optical disk drive, an optical disk, a security control method for an optical disk drive, and a security control program product for an optical disk drive, by which security control is improved so that one or more of the problems can be solved.

According to one aspect of the present invention, there is provided an optical disk drive comprising a writing section for writing data and security information associated with the data onto an optical disk, identical security information being stored at a plurality of locations on the optical disk, a reading section for reading the data and the security information from the optical disk, and an access restricting section for restricting the reading of data, based on the security information associated with the data to be read, during the data is read from the optical disk using the reading section, wherein a comparison is made among fragments of the security information read from the plurality of locations on the optical disk to be read, and the access restricting section restricts the reading of the data to be read based on a security information fragment with the highest frequency.

According to another aspect of the present, there is provided an optical disk drive for reading data from an optical disk, the optical disk storing the data and security information associated with the data, identical security information being stored at a plurality of locations on the optical disk, the optical disk drive comprising a reading section for reading the data and the security information from the optical disk, and an access restricting section for restricting the reading of data, based on the security information associated with the data to be read, during when the data is read from the optical disk using the reading section, wherein a comparison is made among fragments of the security information read from the plurality of locations on the optical disk to be read, and the access restricting section restricts the reading of the data to be read based on a security information fragment with the highest frequency.

More specifically, it is preferable that the security information be information represented by a string of consecutive bits, and the access restricting section compares, for each column of bits, bit values read as the security information from the plurality of locations, and selects a bit value that occurs with the highest frequency in each column of bits as a correct bit value in the column of bits.

It is further preferable that the optical disk drive further comprises an error detection section for detecting an error frequency in the data read by the reading section, wherein the access restricting section corrects the security information based on the data error frequency obtained by the error detection section.

According to another aspect of the present invention, there is provided an optical disk drive comprising a writing section for writing data and security information associated with the data onto an optical disk, wherein identical security information is written at a plurality of locations on the optical disk.

According to another aspect of the present, there is provided an optical disk for storing data and security information associated with the data, wherein identical security information is written at a plurality of locations.

According to another aspect of the present, there is provided an optical disk drive security control method for providing control over data stored on an optical disk, the optical disk storing the data and security information associated with the data, identical security information being stored at a plurality of locations on the optical disk, the security control method comprising the steps of reading the security information associated with the data subject to security control from the plurality of locations on the optical disk, and determining correct security information by comparing fragments of the security information read from the plurality of locations and then by selecting a security information fragment with the highest frequency, wherein the correct security information is used in processing of the data subject to security control.

More specifically, it is preferable that the security information is information represented by a string of consecutive bits, and the correct security information is determined by comparing, for each column of bits, bit values read from the plurality of locations and then by selecting a bit value that occurs with the highest frequency in each column of bits as a correct bit value in the column of bits.

It is more preferable that the optical disk drive security control method further comprises the step of detecting an error frequency in the data stored on the optical disk, wherein the correct security information is determined based on the error frequency.

According to another aspect of the present invention, there is provided an optical disk drive security control program product for providing control over data stored on an optical disk, the optical disk storing the data and security information associated with the data, identical security information being stored at a plurality of locations on the optical disk, the security control program product comprising computer readable program code for causing a computer to perform the steps of reading the security information associated with the data subject to security control from the plurality of locations on the optical disk, and determining correct security information by comparing fragments of the security information read from the plurality of locations and then by selecting a security information fragment with the highest frequency.

More specifically, it is preferable that the security information is information represented by a string of consecutive bits, and the correct security information is determined by comparing, for each column of bits, bit values read from the plurality of locations and then by selecting a bit value that occurs with the highest frequency in each column of bits as a correct bit value in the column of bits.

It is more preferable that the program code further causes the computer to perform the step of detecting an error frequency in the data stored on the optical disk, and the correct security information is determined based on the error frequency.

BRIEF DESCRIPTION OF THE DRAWINGS

FIG. 8 is a diagram illustrating comparison and correction processes on the security information in the embodiment of the present invention.

DESCRIPTION OF PREFERRED EMBODIMENT

A preferred embodiment of the present invention will be described in detail with reference to the drawings.

Drive Configuration

Figure 1:
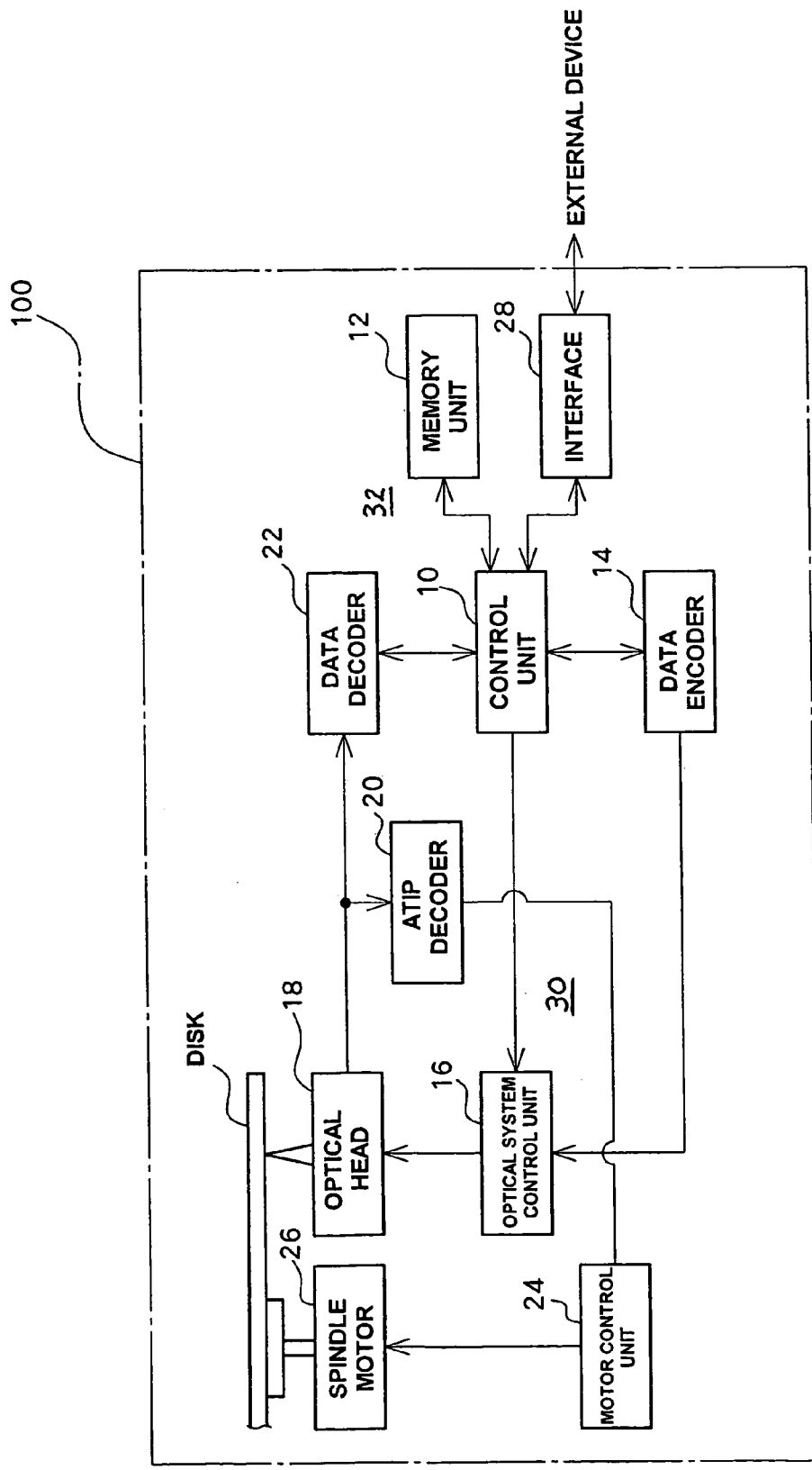
FIG. 1 is a block diagram showing a configuration of an optical disk drive according to an embodiment of the present invention.

As shown in FIG. 1, an optical disk drive 100 according to the embodiment of the present invention comprises a control unit 10, a memory unit 12, a data encoder 14, an optical system control unit 16, an optical head 18, an ATIP decoder 20, a data decoder 22, a motor control unit 24, a motor 26, and an interface 28.

The optical disk drive 100, connected and in communication via the interface 28 with an external device, can receive data input from and can output data to devices such as, for example, an externally provided host computer.

The control unit 10 is connected to and in communication with the memory unit 12, the data encoder 14, the optical system control unit 16, the data decoder 22, and the interface 28. The control unit 10 controls the optical disk drive 100 by execution of a control program stored in the memory unit 12. The control unit 10 temporarily stores, in the memory unit 12, data received from the interface 28. The data is read out as needed and sent to the data encoder 14.

In response to control commands received from the control unit 10, the data encoder 14 converts the received data into a data format suitable for writing the data to an optical disk, and outputs the converted data to the optical system control unit 16.

In response to a data write command from the control unit 10, the optical system control unit 16 controls the operation of the optical head 18 in order to write the data received from the data encoder 14 to an optical disk. When a data read command is received from the control unit 10, the optical system control unit 16 outputs, to the data decoder 22 and the ATIP decoder 20, data read from an optical disk by controlling the operation of the optical head 18. The control unit 10, the optical system control unit 16, the optical head 18, the ATIP decoder 20, the data decoder 22, the motor control unit 24 and the spindle motor 26 together comprise a reading section 30 of the optical disk drive 100.

The optical head 18 includes a laser, a lens, an actuating mechanism, and the like, which are arranged so as to enable writing and reading data to and from an optical disk. For example, a laser with a wavelength of 650 nm can be used for a DVD.

The ATIP decoder 20 decodes a wobble signal sampled from an optical disk to obtain an ATIP (absolute time in pre-groove) address and outputs the ATIP address to the motor control unit 24.

The data decoder 22 receives data read from an optical disk, decodes the received data, and sends the data to the control unit 10.

After receiving the ATIP address from the ATIP decoder 20, the motor control unit 24 adjusts the rotation of an optical disk by controlling the operation of the spindle motor 26. For example, the rotation of an optical disk may be controlled to ensure that the optical disk rotates at a constant linear velocity in synchronization with the ATIP address.

Write Operation of Data and Security Information

Figure 2:
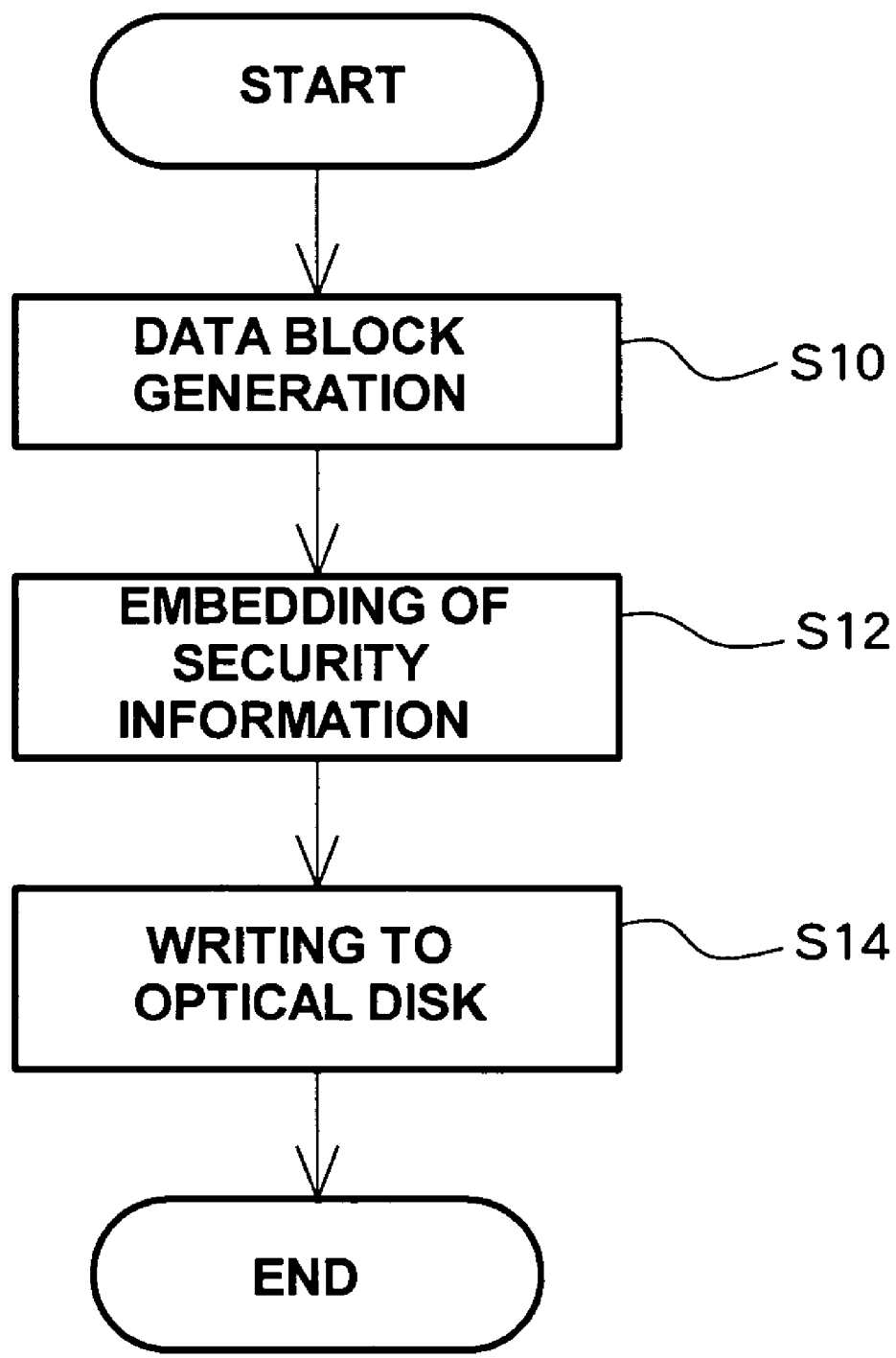
FIG. 2 is a flowchart of a data writing process in the embodiment of the present invention.

A data and security information write operation according to the present embodiment will be described in detail with reference to the drawings. The write operation in the present embodiment can be performed through execution by the control unit 10 of a program in which steps shown in the flowchart of FIG. 2 are coded The program is stored in the memory unit 12.

At step S10, after data to be written is received from the external device, the received data is divided into data blocks. As the data blocks, for example, ECC (product code) data blocks of a Reed-Solomon product code can be used. According to the Reed-Solomon product code, error correction is performed using a total of 37 kB of an ECC (product code) data block in which 5 kB of redundant data (parity) for error correction is added to 32 kB of actual data.

Figure 3:
FIG. 3 is a diagram illustrating a configuration of a data block obtained from a data string.
Figure 4:
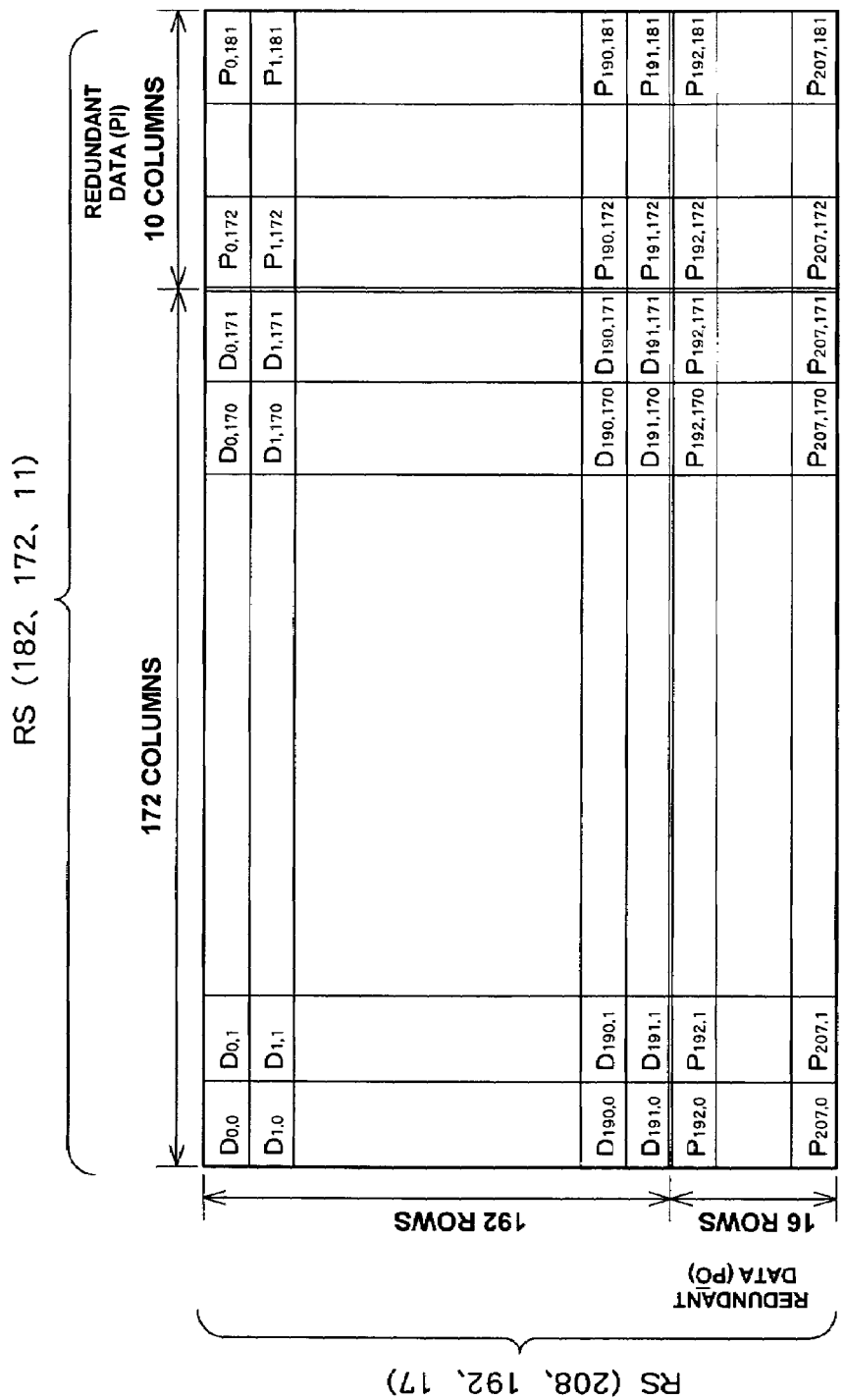
FIG. 4 is a diagram illustrating an example of a product code data block based on a Reed-Solomon product code.

As shown in FIG. 3, data elements $D_0, D_1, \ldots$ and $D_n$ in units of 1 byte are arranged in a matrix in the order in which the data elements are read, starting from top left, going right until a total of the data elements in a row reaches a predetermined amount k, and moving to a new row every time the predetermined amount is reached. Then, as shown in FIG. 4, after the data elements $D_{i,j}$ (i and j represent the row and column numbers) are grouped into a block, redundant data PI and PO are added to each row and each column, respectively. Each row is referred to as an inner code, and each column is referred to as an outer code. Typically, a sequence of the inner codes R is expressed as RS (182, 172, 11), and a sequence of the outer codes C is expressed as RS (208, 192, 17). In the expression of RS (n, k, d), the values n, k, and d represent a code length, an information symbol length, and a minimum distance between code words, respectively.

According to the Reed-Solomon product code, its effective error-correcting function enables complete correction of minimal errors that may occur in the ECC data blocks. The present invention utilizes this effective error-correcting function.

At step S12, after security information is received from the external device, the received security information is embedded in a plurality of ECC data blocks. The number of ECC data blocks in which the security information is to be embedded can be preset before the start of the write operation.

Figure 5:
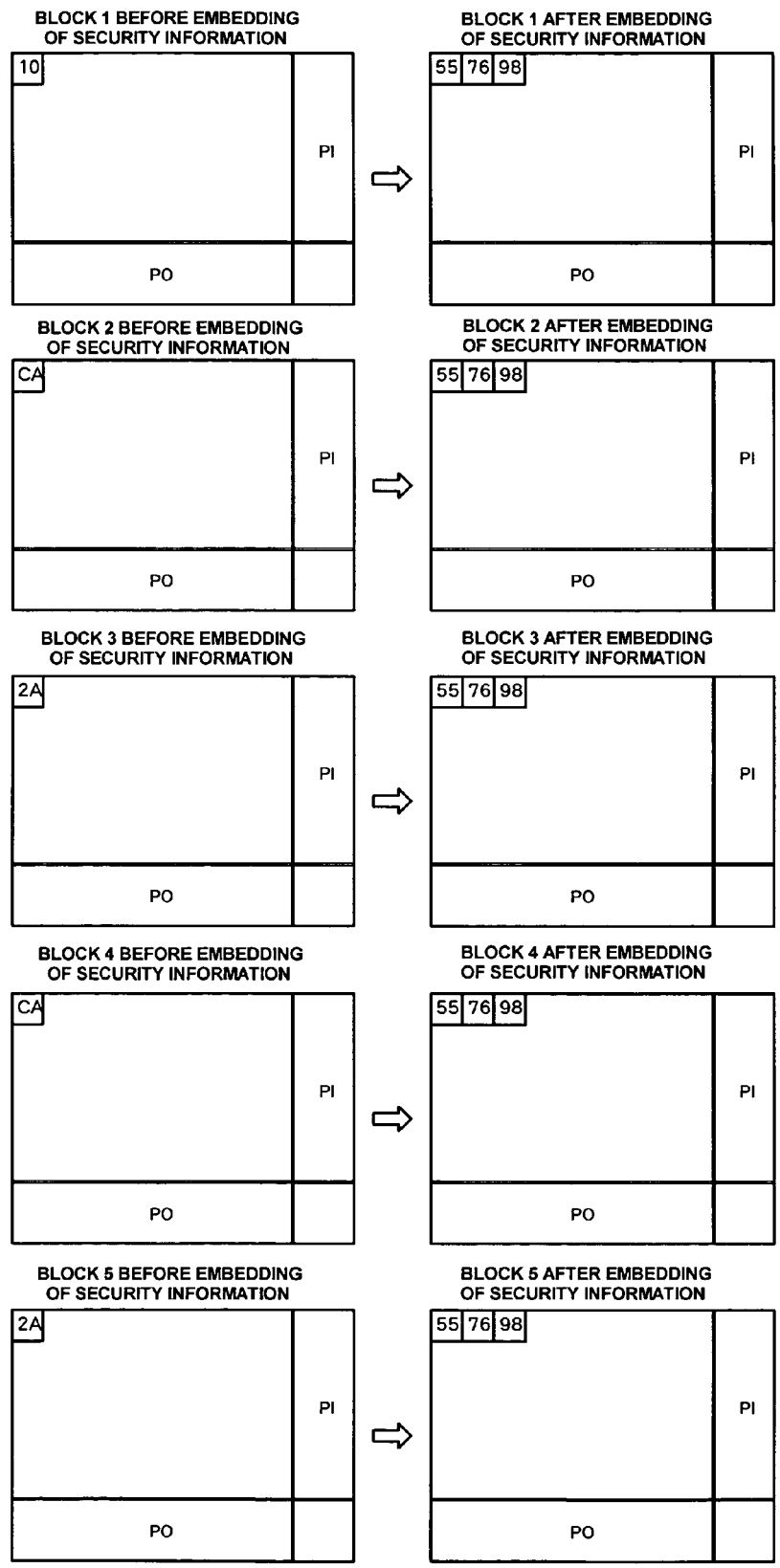
FIG. 5 is a diagram illustrating a process of embedding security information in the data block in the embodiment of the present invention.

In an example in which the amount of security information for the data to be written is 3 bytes, and the respective values are 55*h*, 76*h*, and 98*h*, when one (1) set of security information is preset to be embedded in five (5) ECC data blocks, as shown in FIG. 5, initial data values in five (5) ECC data blocks obtained from the data to be written are sequentially replaced with the security information.

In this step, the ECC data blocks in which the security information is to be embedded may be selected at random. In addition, the locations in which the security information is to be embedded may be predetermined in any locations in data areas in the ECC data blocks. The security information may be embedded in the predetermined locations.

Furthermore, when two or more sets of security information are to be embedded, these security information sets may be embedded in a single ECC data block. However, it is preferable that the number of security information sets to be embedded in a single ECC data block is limited to a level at which the Reed-Solomon product code is effective in correcting errors that may occur during write and read operations. Therefore, when the amount of security information is too large for error correction to work, it is preferable that the security information is divided up and shared among, and embedded in the ECC data blocks.

For example, when a Reed-Solomon product code including a sequence of inner codes RS (182, 172, 11) and a sequence of outer codes RS (208, 192, 17) is employed, the number of data elements in which errors can be corrected is 93 bytes, when no burst error occurs.

At step S14, information in the ECC data block in which the security information is embedded is actually written onto an optical disk. It may be preferable that a statement indicating that the security information is embedded be written as disk control information.

Through the above-described processing, the data and security information can be written onto an optical disk.

Read Operation of Data and Security Information

Figure 6:
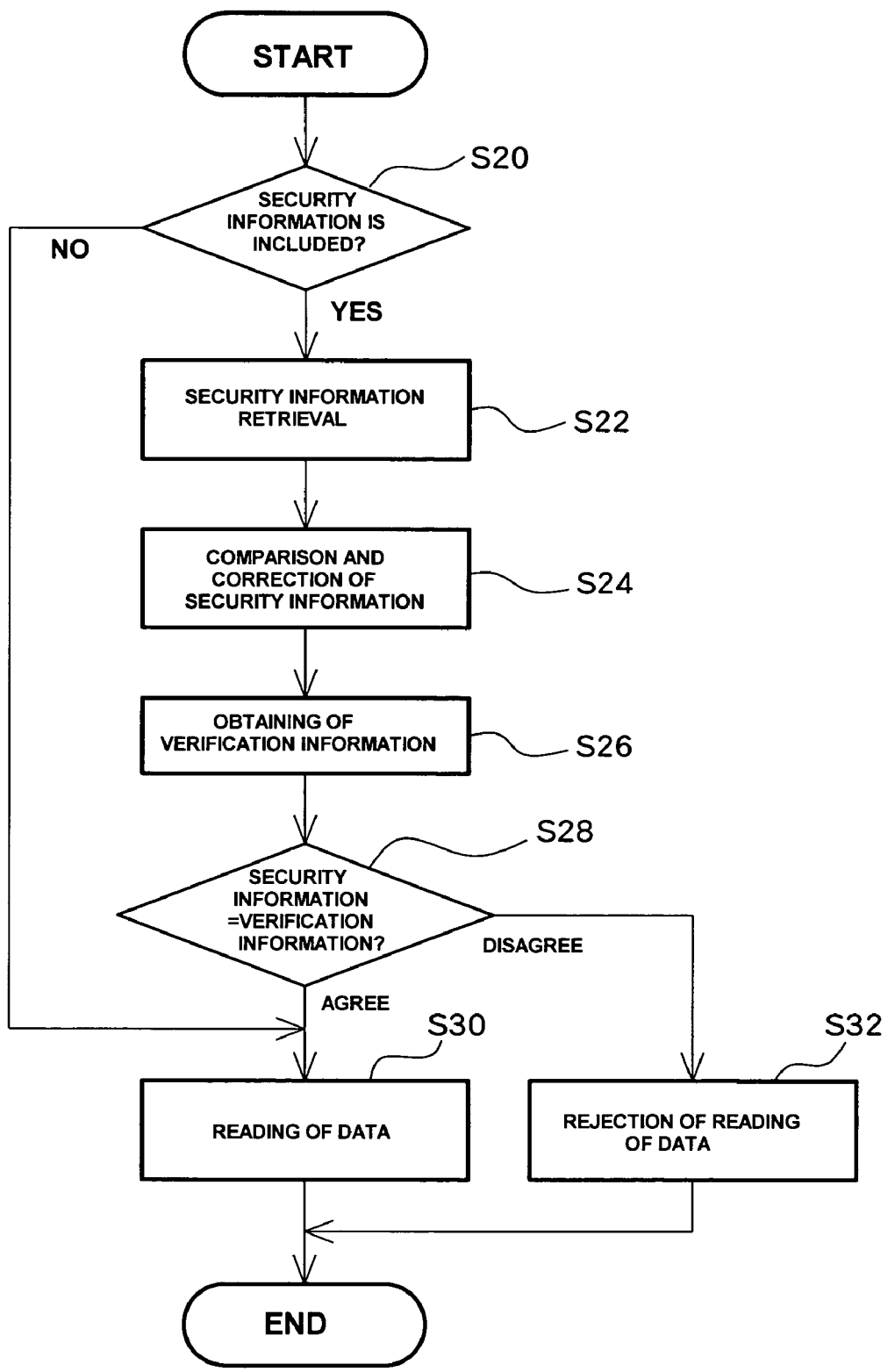
FIG. 6 is a flowchart of a data reading process in the embodiment of the present invention.

A read operation of data and security information according to the present embodiment will be described in detail with reference to the drawings. The read operation in the present embodiment can be performed through execution by the control unit 10 of a program in which steps shown in the flowchart of FIG. 6 are coded. The program is stored in the memory unit 12. The control unit 10 performs the process shown in the flowchart of FIG. 6 to control the reading section 30, thereby implementing an access restricting section 32 of the optical disk drive 100.

At step S20, in response to a command from the external device, the optical disk control information and the like are read, and it is determined whether or not security information is stored in association with the data to be read. If it is found that security information is recorded, the process proceeds to step S22, and otherwise, the process proceeds to step S30.

At step S22, the security information embedded in the data to be read is retrieved and sent to the external device.

First, a data area on an optical disk is accessed, and the data to be read is regrouped into the ECC data blocks. Then, error correction is performed on the data in the ECC data blocks according to the Reed-Solomon product code. In this step, data error rates are compared between the ECC data blocks, and an ECC data block having a high error rate is determined as the one with the security information embedded therein. The security information is retrieved from the predetermined locations in the ECC data blocks in which it is determined that the security information is embedded.

Figure 7:
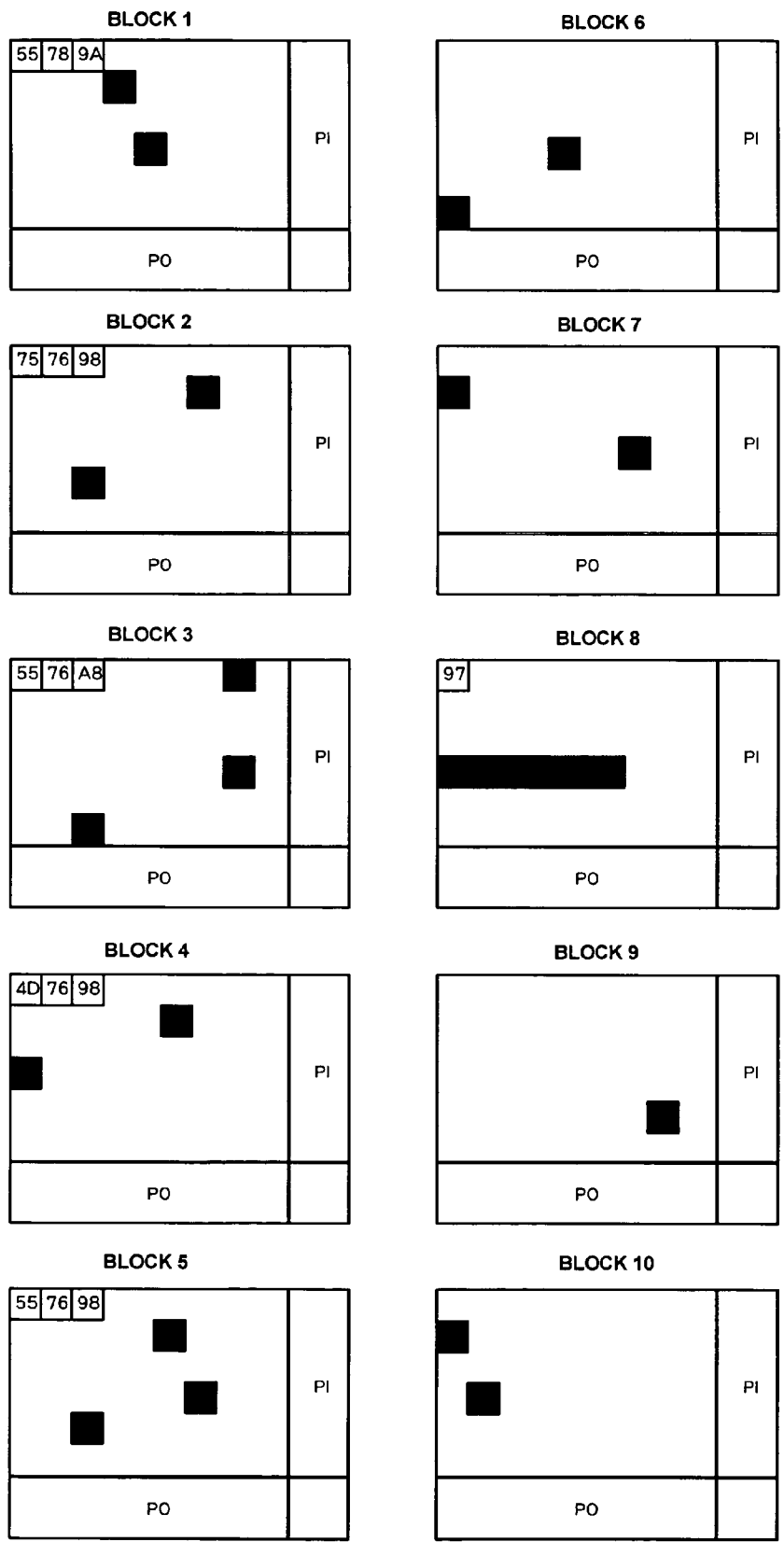
FIG. 7 is a diagram illustrating a process of reading the security information from the data block in the embodiment of the present invention.

For example, data in which the security information is embedded in the initial three (3) bytes of the ECC data blocks, as shown in FIG. 5, is read and reproduced into ECC data blocks as shown in FIG. 7. In this diagram, data bytes filled in with black represent data with errors produced during the writing or reading of the data.

In each ECC data block, data errors generally occur with an almost constant probability. Because the security information itself is recognized as a data error, the data error rate of an ECC data block in which the security information is embedded is higher than the data error rate of an ECC data block in which the security information is not embedded. In the example of FIG. 7, the security information is embedded in the ECC data blocks 1–5. Therefore, the ECC data blocks 1–5 have higher error rates than other ECC data blocks, and thus it can be judged that the security information may be retrieved from these ECC data blocks.

In this step, when an error rate becomes high as shown in the ECC data block 8 for some accidental reason, an attempt is made to retrieve the security information also from the ECC data block 8 in which the security information is not actually embedded. The processing of such cases will be described in detail later.

At step S24, the security information values retrieved from a plurality of ECC data blocks are compared to correct errors in the security information.

For example, the fragments of the security information read from the example of FIG. 7 are retrieved as 55h, 75h, 55h, 4Dh, and 55h. Likewise, an information fragment of 97h is erroneously retrieved from the ECC data block in which the security information is not embedded.

Then, as shown in FIG. 8, the retrieved security information values are compared for each column of bits, a bit value that occurs with a high frequency is selected as the correct bit value in the column of bits. For example, because the most significant bits are 0, 0, 0, 0, 0, and 1, in other words, 5 zeros and a one, "0" is selected as the correct bit value for the most significant bit.

Furthermore, it is preferable that the processing is performed with weights assigned to the bit strings according to the data error rates of the ECC data blocks from which the security information values are retrieved. More specifically, when the data error rate of an ECC data block from which the security information value is retrieved is high, the probability that an erroneous value is retrieved as the security information value is considered to be high. Therefore, weights are assigned such that the importance to be placed on the security information retrieved from an ECC data block with a high data error rate is set low.

As described above, by comparing a plurality of retrieved security information values, and then by selecting a security information value with the highest frequency as the correct security information value, even when errors occur in the data-embedded security information, or when an erroneous attempt is made to retrieve the security information from an ECC data block in which the security information is not embedded, it is possible to increase the possibility of obtaining the correct security information.

At step S26, verification information is obtained from a user or the like in order to judge whether or not the reading of data should be restricted. The verification information is obtained through the external device.

At step S28, a comparison is made between the correct security information retrieved in step S24 and the verification information obtained in step S26. If the verification information agrees with the retrieved correct security information, the process proceeds to step S30, and otherwise, the process proceeds to step S32.

When the errors in the security information are too numerous, or when much of the security information is incorrectly read due to burst errors or the like, the security information cannot be completely corrected in step S24. In consideration of such cases, even if a complete agreement is not found between the retrieved correct security information and the verification information, as long as they agree to a certain extent, the process may proceed to step S30.

At step S30, the data to which access can be permitted is read from the optical disk and is sent to the external device. The external device presents the data to the user. On the other hand, in step S32, the reading of data is rejected. Optionally, the optical disk may be forcefully ejected from the drive.

Although, in the present embodiment, data error correction is performed using a Reed-Solomon product code, the present invention is not limited to this configuration, and similar processing can be performed using other error correction techniques.

As described above, according to the present embodiment, data can be stored with increased security by recording security information, such as a user name, a password, and a cipher key, in the data stored on an optical disk.

Because the security information is stored by being embedded in the data, the control area provided on an optical disk can be reduced. Further, because the security information is stored by being distributed over an optical disk, the security information becomes less susceptible to leakage and tampering, and access time can be shortened.

The present invention is advantageous in that it enables realization of an optical disk drive, an optical disk, a security control method for an optical disk drive, and a security control program product for an optical disk drive, by which security and accessibility in an optical disk system for optical disks such as a compact disk and a digital versatile disk are improved.

What is claimed is:

1. An optical disk drive for reading data from an optical disk, the optical disk storing the data and security information associated with the data, identical security information being stored at a plurality of locations on the optical disk, the optical disk drive comprising:
   a reading section for reading the data and the security information from the optical disk; and
   an access restricting section for restricting the reading of data, based on the security information associated with the data to be read, during when the data is read from the optical disk using the reading section, wherein a comparison is made among fragments of the security information read from the plurality of locations on the optical disk to be read, and the access restricting section restricts the reading of the data to be read based on a security information fragment with the highest frequency;
   wherein the security information is information represented by a string of consecutive bits, and the access restricting section compares, for each column of bits, bit values read as the security information from the plurality of locations, and selects a bit value with the highest frequency in each column of bits as a correct bit value in the column of bits.

2. An optical disk drive according to claim 1, comprising a writing section for writing data and security information associated with the data onto an optical disk, wherein identical security information is written at a plurality of locations on the optical disk.

3. An optical disk drive for reading data from an optical disk, the optical disk storing the data and security information associated with the data, identical security information being stored at a plurality of locations on the optical disk, the optical disk drive comprising:
   a reading section for reading the data and the security information from the optical disk;
   an access restricting section for restricting the reading of data, based on the security information associated with the data to be read, during when the data is read from the optical disk using the reading section, wherein a comparison is made among fragments of the security information read from the plurality of locations on the optical disk to be read, and the access restricting section restricts the reading of the data to be read based on a security information fragment with the highest frequency; and
   an error detection section for detecting an error frequency in the data read by the reading section, wherein the access restricting section corrects the security information based on the data error frequency obtained by the error detection section.

4. An optical disk drive according to claim 3, comprising a writing section for writing data and security information associated with the data onto an optical disk, wherein identical security information is written at a plurality of locations on the optical disk.

5. An optical disk drive security control method for providing control over data stored on an optical disk, the optical disk storing the data and security information associated with the data, identical security information being stored at a plurality of locations on the optical disk, the security control method comprising the steps of:
　reading the security information associated with the data subject to security control from the plurality of locations on the optical disk; and
　determining correct security information by comparing fragments of the security information read from the plurality of locations and then by selecting a security information fragment with the highest frequency, wherein the correct security information is used in processing of the data subject to security control;
　wherein the security information is information represented by a string of consecutive bits, and the correct security information is determined by comparing, for each column of bits, bit values read from the plurality of locations and then by selecting a bit value with the highest frequency in each column of bits as a correct bit value in the column of bits.

6. An optical disk drive security control method for providing control over data stored on an optical disk, the optical disk storing the data and security information associated with the data, identical security information being stored at a plurality of locations on the optical disk, the security control method comprising the steps of:
　reading the security information associated with the data subject to security control from the plurality of locations on the optical disk;
　determining correct security information by comparing fragments of the security information read from the plurality of locations and then by selecting a security information fragment with the highest frequency, wherein the correct security information is used in processing of the data subject to security control; and
　detecting an error frequency in the data stored on the optical disk, wherein the correct security information is determined based on the error frequency.

7. An optical disk drive security control computer readable recording medium storing a program for providing control over data stored on an optical disk, the optical disk storing the data and security information associated with the data, identical security information being stored at a plurality of locations on the optical disk, the security control program product comprising computer readable program code for causing a computer to perform the steps of:
　reading the security information associated with the data subject to security control from the plurality of locations on the optical disk; and
　determining correct security information by comparing fragments of the security information read from the plurality of locations and then by selecting a security information fragment with the highest frequency;
　wherein the security information is information represented by a string of consecutive bits, and the correct security information is determined by comparing, for each column of bits, bit values read from the plurality of locations and then by selecting a bit value with the highest frequency in each column of bits as a correct bit value in the column of bits; and
　further including the step of restricting access so as to restrict reading of data to be read, based on the correct security information determined in the step of determining correct security information.

8. An optical disk drive security control computer readable recording medium storing a program for providing control over data stored on an optical disk, the optical disk storing the data and security information associated with the data, identical security information being stored at a plurality of locations on the optical disk, the security control program product comprising computer readable program code for causing a computer to perform the steps of:
　reading the security information associated with the data subject to security control from the plurality of locations on the optical disk; and
　determining correct security information by comparing fragments of the security information read from the plurality of locations and then by selecting a security information fragment with the highest frequency;
　wherein the program code further causes the computer to perform the step of detecting an error frequency in the data stored on the optical disk, and the correct security information is determined based on the error frequency; and
　further including the step of restricting access so as to restrict reading of data to be read, based on the correct security information determined in the step of determining correct security information.

* * * * *